United States Patent
Imaoka et al.

(10) Patent No.: US 10,047,693 B2
(45) Date of Patent: Aug. 14, 2018

(54) FUEL INJECTION CONTROL DEVICE AND FUEL INJECTION CONTROL METHOD FOR INTERNAL COMBUSTION ENGINE

(71) Applicant: Nissan Motor Co., Ltd., Yokohama-shi, Kanagawa (JP)

(72) Inventors: Yoshihiro Imaoka, Kanagawa (JP); Takao Inoue, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 97 days.

(21) Appl. No.: 15/302,747

(22) PCT Filed: May 15, 2014

(86) PCT No.: PCT/JP2014/063002
§ 371 (c)(1),
(2) Date: Oct. 7, 2016

(87) PCT Pub. No.: WO2015/173937
PCT Pub. Date: Nov. 19, 2015

(65) Prior Publication Data
US 2017/0030286 A1 Feb. 2, 2017

(51) Int. Cl.
*F02D 41/30* (2006.01)
*F01P 7/16* (2006.01)
(Continued)

(52) U.S. Cl.
CPC .......... *F02D 41/3005* (2013.01); *F01P 3/02* (2013.01); *F01P 7/16* (2013.01); *F01P 7/165* (2013.01);
(Continued)

(58) Field of Classification Search
CPC .... F01P 7/165; F01P 2003/027; F02D 41/047
See application file for complete search history.

(56) References Cited

U.S. PATENT DOCUMENTS

| 6,595,164 B2 * | 7/2003 | Kunze | F01P 3/02 |
| | | | 123/41.1 |
| 6,912,989 B2 * | 7/2005 | Tayama | F02B 23/101 |
| | | | 123/276 |

(Continued)

FOREIGN PATENT DOCUMENTS

JP 2012-102654 A 5/2012

*Primary Examiner* — Stephen K Cronin
*Assistant Examiner* — Kevin R Steckbauer
(74) *Attorney, Agent, or Firm* — Global IP Counselors, LLP (57) ABSTRACT

A fuel injection control device controls fuel injection of a spark-ignition internal combustion engine for direct injection into a cylinder and independently controls circulation of a coolant in a head-side cooling channel and in a block-side cooling channel. The fuel injection control device is provided with a controller that sets a fuel injection timing for cooling the inside of the cylinder such that an intake valve closing timing occurs during a reduction in gas temperature inside the cylinder due to evaporative latent heat of the injected fuel, while the coolant circulates in the head-side cooling channel and the circulation of the coolant in the block-side cooling channel is stopped. The controller injects the fuel based on the fuel injection timing for cooling the inside of the cylinder.

20 Claims, 8 Drawing Sheets

(51) Int. Cl.
   *F02D 41/22*   (2006.01)
   *F02D 41/26*   (2006.01)
   *F02D 41/04*   (2006.01)
   *F02D 41/34*   (2006.01)
   *F02D 41/40*   (2006.01)
   *F01P 3/02*    (2006.01)
   *F02D 13/02*   (2006.01)

(52) U.S. Cl.
   CPC ......... *F02D 41/047* (2013.01); *F02D 41/22* (2013.01); *F02D 41/263* (2013.01); *F02D 41/345* (2013.01); *F02D 41/402* (2013.01); *F01P 2003/027* (2013.01); *F02D 13/0234* (2013.01); *F02D 2200/021* (2013.01); *F02D 2250/14* (2013.01); *Y02T 10/44* (2013.01)

(56) References Cited

U.S. PATENT DOCUMENTS

| | | | | |
|---|---|---|---|---|
| 7,983,832 | B2* | 7/2011 | Sukegawa | F02D 41/047 123/434 |
| 8,165,788 | B2* | 4/2012 | Surnilla | F02D 41/0025 123/406.11 |
| 8,352,166 | B2* | 1/2013 | Surnilla | F02D 41/0025 123/406.11 |
| 8,447,496 | B2* | 5/2013 | Krengel | F02D 19/061 123/304 |
| 8,712,669 | B2* | 4/2014 | Krengel | F02D 19/061 123/304 |
| 8,910,617 | B2* | 12/2014 | Yokoyama | F01L 1/3442 123/445 |
| 8,985,086 | B2* | 3/2015 | Shishime | F02D 41/405 123/299 |
| 2002/0069839 | A1* | 6/2002 | Kunze | F01P 3/02 123/41.1 |
| 2002/0152979 | A1* | 10/2002 | Hayashi | F01P 3/02 123/142.5 R |
| 2004/0216714 | A1* | 11/2004 | Tayama | F02B 23/101 123/276 |
| 2008/0208438 | A1* | 8/2008 | Sukegawa | F02D 41/047 701/105 |
| 2010/0294236 | A1* | 11/2010 | Surnilla | F02D 41/0025 123/304 |
| 2011/0184629 | A1* | 7/2011 | Krengel | F02D 19/061 701/103 |
| 2012/0111302 | A1* | 5/2012 | Shishime | F02D 41/405 123/299 |
| 2012/0203443 | A1* | 8/2012 | Surnilla | F02D 41/0025 701/103 |
| 2013/0025568 | A1* | 1/2013 | Yokoyama | F01L 1/3442 123/445 |
| 2013/0253803 | A1* | 9/2013 | Krengel | F02D 19/061 701/103 |

* cited by examiner

FUEL INJECTION CONTROL DEVICE AND FUEL INJECTION CONTROL METHOD FOR INTERNAL COMBUSTION ENGINE

CROSS-REFERENCE TO RELATED APPLICATIONS

This application is a U.S. National stage application of International Application No. PCT/JP2014/063002, filed May 15, 2014.

BACKGROUND

Field of the Invention

The present invention relates to a fuel injection control device and a fuel injection control method for an internal combustion engine.

Background Information

Increasing the compression ratio is an effective measure to improve the thermal efficiency of an internal combustion engine to improve the fuel efficiency. However, in an internal combustion engine that uses gasoline as fuel, knocking becomes more likely to occur as the compression ratio is increased and, thus, it becomes necessary to take measures to suppress the knocking. For example, retarding the ignition timing is a known method to suppress knocking, but the torque is reduced as the ignition timing is retarded. That is, by retarding the ignition timing, the torque that should be obtainable through achieving a high compression ratio cannot be obtained.

Therefore, in JP2012-102654A, in order to achieve a high compression ratio while suppressing knocking, the final injection of a multi-stage injection internal combustion engine that carries out a multi-stage injection of fuel, is carried out in a compression stroke when in a low speed region in which knocking is likely to occur. The object of this control is to reduce the gas temperature in a cylinder by the evaporative latent heat of the fuel that is injected in the compression stroke.

SUMMARY

The compression stroke is a compression in a state in which the intake valve and the exhaust valve are closed, which can be considered as an adiabatic compression stroke. If fuel is injected in the course of such an adiabatic compression stroke, while a decrease in the gas temperature inside the cylinder due to evaporative latent heat does occur, the effect of reducing the gas temperature inside the cylinder near the top dead center in which knocking is likely to occur is small. In other words, there is room for improvement in the control of the above-described document, as a control for suppressing knocking.

Therefore, the object of the present invention is to carry out a fuel injection control that is capable of more reliably suppressing knocking.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be described below, with reference to the appended drawings.

Figure 1:
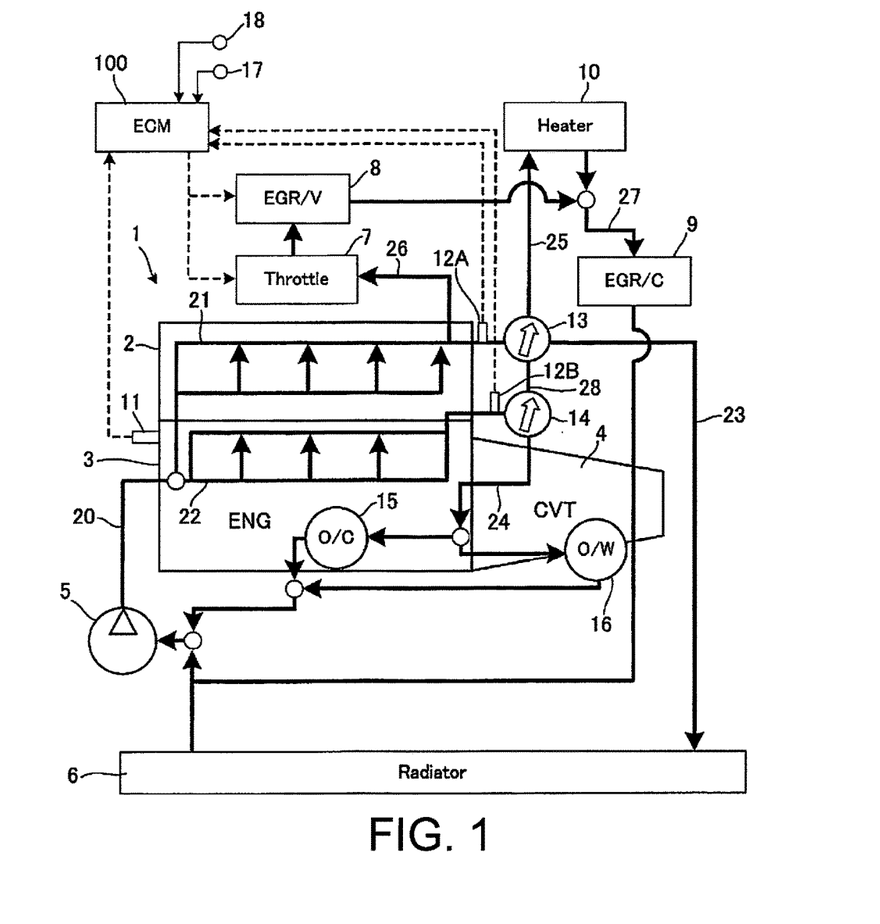
FIG. 1 is a block diagram illustrating one example of an engine cooling system.

FIG. 1 is a block diagram illustrating one example of a cooling system to which is applied the present embodiment. The present cooling system cools an internal combustion engine 1 by circulating cooling water using a water pump 5 that is driven by a spark-ignition internal combustion engine having direct fuel injection into a cylinder (hereinafter also simply referred to as "internal combustion engine") 1. The water pump 5 may be an electric pump that is driven by an electric motor as well.

The cooling water channel inside the internal combustion engine 1 is branched into two lines, a head-side cooling channel 21 provided in a cylinder head 2, and a block-side cooling channel 22 provided in a cylinder block 3. A first control valve 13 is disposed on the cylinder head outlet side of the head-side cooling channel 21, and a second control valve 14 is provided on the cylinder block outlet side of the block-side cooling channel 22.

A head-side water temperature sensor 12A is disposed between the cylinder head outlet of the head-side cooling channel 21 and the first control valve 13 for detecting the water temperature of the head-side cooling channel 21 (hereinafter also referred to as "head-side water temperature"). A block-side water temperature sensor 12B is disposed between the cylinder block outlet of the block-side cooling channel 22 and the second control valve 14 for detecting the water temperature of the block-side cooling channel 22 (hereinafter also referred to as "block-side water temperature"). The detection signals of the head-side water temperature sensor 12A and the block-side water temperature sensor 12B are sent to a controller 100, to be described later.

A heater passage 25 connected to a heater core 10, a connection passage 28 connected to the second control valve 14, and a radiator passage 23 connected to the radiator 6 are connected to the first control valve 13, and it is possible to communicate with the head-side cooling channel 21 by selecting one of these passages. Additionally, it is possible to restrict the flow of cooling water in the head-side cooling channel 21 by closing the first control valve 13.

On the other hand, an engine-side return passage 24 and a connection passage 28 that are connected to an oil cooler 15 and an oil warmer 16, are connected to the second control valve 14, and it is possible to communicate with the block-side cooling channel 22 by selecting one of these passages. Additionally, it is possible to restrict the flow of cooling water in the block-side cooling channel 22 by closing the second control valve 14.

The first control valve 13 and the second control valve 14 are both controlled by the controller 100, described later.

The second control valve 14 may also be a thermostat valve in order to simplify the system.

The heater passage 25 is a passage for supplying cooling water to the heater core 10. A heater-side return passage 27 is connected to the heater core 10 for returning the cooling water that has undergone heat exchange with air in the heater core 10 to the water pump 5. An EGR cooler 9 is interposed in the heater-side return passage 27 for cooling EGR gas.

The engine-side return passage 24 is a passage that links the second control valve 14 and the water pump 5, and a portion thereof is branched. An oil cooler 15 is connected to one of the branches for cooling the lubricating oil of the internal combustion engine 1, and an oil warmer 16 is connected to the other of the branches for warming the hydraulic oil of the automatic transmission 4.

The radiator passage 23 is a passage links the first control valve 13 and the water pump 5, with a radiator 6 is interposed in an intermediate position thereof.

In addition, a throttle-side passage 26 is branched from the head-side cooling channel 21 for merging with the heater-side return passage 27 via a throttle chamber 7 and an EGR valve 8.

The cylinder head 2 has an oil temperature sensor 11 that detects the lubricating oil temperature in an oil jacket provided in the cylinder head. The detection signal of the oil temperature sensor 11 is sent to the controller 100.

The controller 100 is configured from a microcomputer comprising a central processing unit (CPU), a read only memory (ROM), a random access memory (RAM), and an input/output interface (I/O interface). The controller 100 can be configured from a plurality of microcomputers as well.

Other than the oil temperature sensor 11, the head-side water temperature sensor 12A, and the block-side water temperature sensor 12B, the controller 100 also receives detection signals from an accelerator pedal opening amount sensor 17 that detects the amount the driver opens the accelerator pedal, and a crank angle sensor 18 that detects the rotational speed of the internal combustion engine 1. Then, the controller 100 executes control of the opening amount of the throttle chamber 7 and the EGR valve 8, fuel injection control of the internal combustion engine 1, ignition timing control, control of the first control valve 13 and the second control valve 14, and the like, based on these detection signals. In addition, the controller 100 respectively infers the wall temperature of the cylinder head 2 (hereinafter also referred to as "head-side wall temperature") based on the head-side water temperature, and the wall temperature of the cylinder block 3 (hereinafter also referred to as "block-side wall temperature") based on the block-side water temperature. For example, the relationship between the wall temperature and the cooling water temperature in the internal combustion engine 1 is examined in advance to create a map, and the map is searched based on the detected cooling water temperature.

In the above-described cooling system, if the internal combustion engine 1 is in a cold engine state, the controller 100 closes the first control valve 13 and the second control valve 14 to restrict the flow of cooling water of the head-side cooling channel 21 and the block-side cooling channel 22. A rise in the cooling water temperature is thereby promoted. On the other hand, if the internal combustion engine 1 is in a warm-up state, the controller 100 opens the first control valve 13 and the second control valve 14. At this time, the controller 100 determines whether to flow the cooling water to the radiator passage 23 or to the engine-side return passage 24 according to the head-side water temperature and the block-side water temperature, and controls the first control valve 13 and the second control valve 14.

In the present embodiment, the threshold values of the head-side wall temperature and the block-side wall temperature are set to 80° C.; the threshold values of the head-side water temperature and the block-side water temperature are set to 80° C.; and the threshold value of the oil temperature is set to 80° C.; if all of the temperatures described above are greater than or equal to the threshold values the state is considered to be the warm-up state; otherwise, the state is considered to be the cold engine state. In the cold engine state, a state in which the head-side wall temperature and the head-side water temperature are greater than or equal to 80° C. and the oil temperature is less than 80° C. is considered to be a high water temperature state.

Additionally, the controller 100 constitutes a fuel injection timing setting means for setting the mode of fuel injection according to the state of the internal combustion engine 1.

Figure 2:
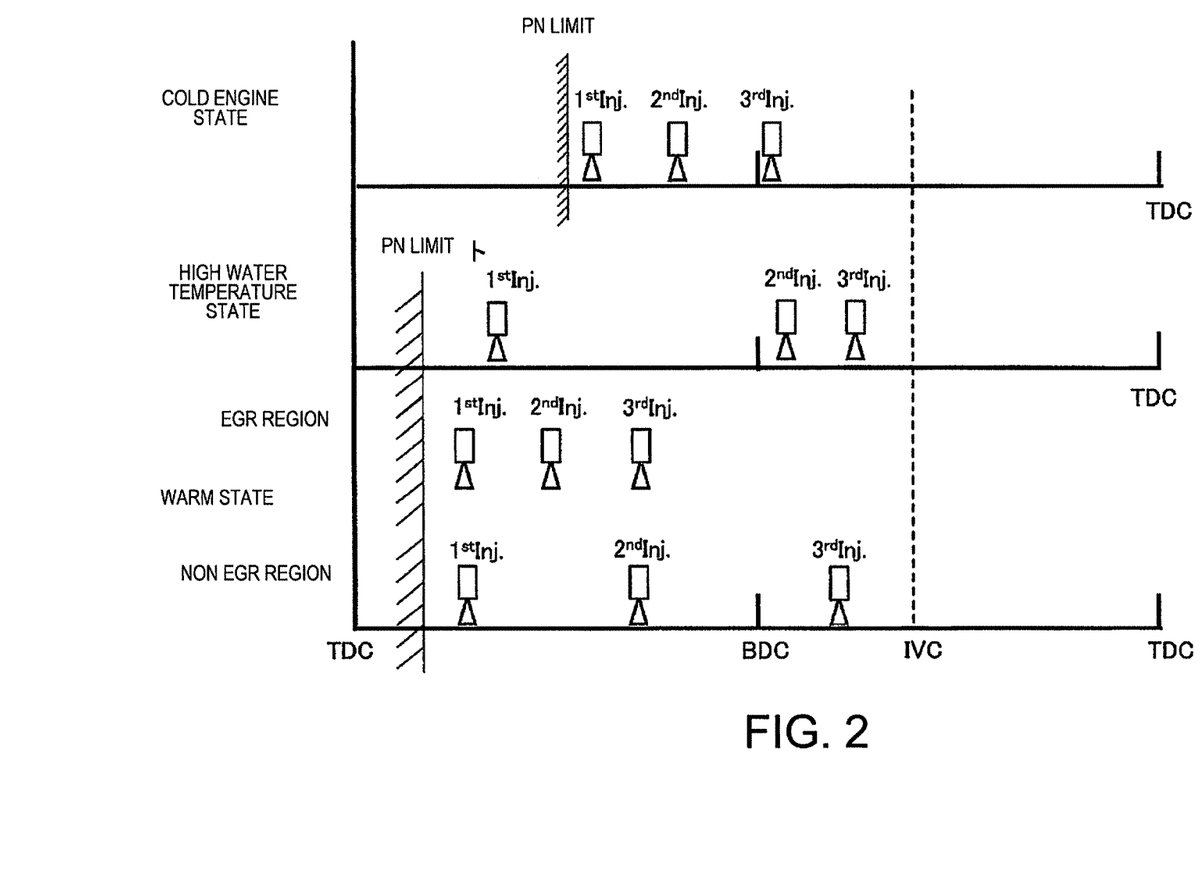
FIG. 2 is a schematic diagram illustrating one example of a fuel injection control pattern.

FIG. 2 is a schematic diagram illustrating the modes of the fuel injection control according to the state of the internal combustion engine 1 in the case of a three-stage injection. The "fuel injection timing" in the following description refers to the timing at which fuel injection is started.

In the cold engine state, excluding the high water temperature state (hereinafter simply referred to as the cold engine state), in order to reduce the amount of emission particulates (PN: Particulate Number), the advance angle of the fuel injection (PN limit) is retarded compared to the other states so as to reduce the adhesion of fuel to the piston and the cylinder wall. Additionally, each injection of the three-stage injection is configured to be at a fuel injection timing that prioritizes suppression of oil dilution by the fuel. In the cold engine state, the controller 100 blocks the circulation of cooling water in the head-side cooling channel 21 and the block-side cooling channel 22. A temperature rise in the head-side wall and the block-side wall is thereby promoted. In addition, a rise in the temperatures of the cooling water of the head-side cooling channel 21 and the block-side cooling channel 22 is also promoted.

On the other hand, in the warm-up state, the mode of fuel injection differs depending on whether or not an EGR control is executed. If executing an EGR control, since knocking is less likely to occur due to the EGR control, the fuel injection timing is set so that fuel injection is completed three times on the advance side of bottom dead center, in order to take a longer mixing time for the in-cylinder gas. Additionally, if an EGR control is not to be executed, in order to secure the mixing time and reduce the gas temperature inside the cylinder, the second and third fuel injection timings are retarded compared to when an EGR control is executed. In particular, the third fuel injection timing is set between the bottom dead center and the intake valve closing timing.

Since the fuel injection modes in the cold engine state and the warm-up state described above are well-known, a detailed description thereof is omitted.

The present embodiment is characterized in the fuel injection control in the high water temperature state described below.

The high water temperature state is a state in which the oil temperature has not risen to the warm-up state temperature, despite the head-side wall temperature and the block-side wall temperature having risen to the warm-up state temperature. Since the friction of each part is increased and the fuel efficiency is reduced as the oil temperature is reduced, it is desirable to promote a rise in the oil temperature when in the high water temperature state. If cooling water is circulated, the head-side wall temperature and the block-side wall temperature are reduced and a rise in the oil temperature is inhibited; therefore, in the high water temperature state, the controller 100 stops the circulation of water in at least the block-side cooling channel 22.

However, if the circulation of cooling water remains stopped, the head-side wall temperature continues to rise, and knocking is likely to occur.

Therefore, in order to prevent knocking, the controller 100 carries out the second fuel injection and the third fuel injection of the three-stage injection between the bottom dead center and the intake valve closing timing, for example, as illustrated in FIG. 2.

When fuel is injected, the gas temperature inside the cylinder is reduced due to the evaporative latent heat of the fuel. However, as the elapsed time increases after the gas temperature inside the cylinder is reduced, heat exchange is allowed to progress between the in-cylinder gas, and the cylinder head and cylinder block, and the reduction margin of the gas temperature inside the cylinder becomes small. Therefore, in order to effectively utilize the reduction of the gas temperature inside the cylinder by the evaporative latent heat of the fuel, the second fuel injection and the third fuel injection are set to be closer to the intake valve closing timing, as described above.

More specifically, the third fuel injection timing is set so that the intake valve closing timing will be when a reduction in the gas temperature is occurring inside the cylinder, due to the evaporative latent heat of the fuel of the third injection. As described below, this is because the reduction margin of the gas temperature inside the cylinder at the intake valve closing timing is further amplified at the compression top dead center. The fuel injection timing described above is referred to as the fuel injection timing for cooling the inside of the cylinder.

Figure 3:
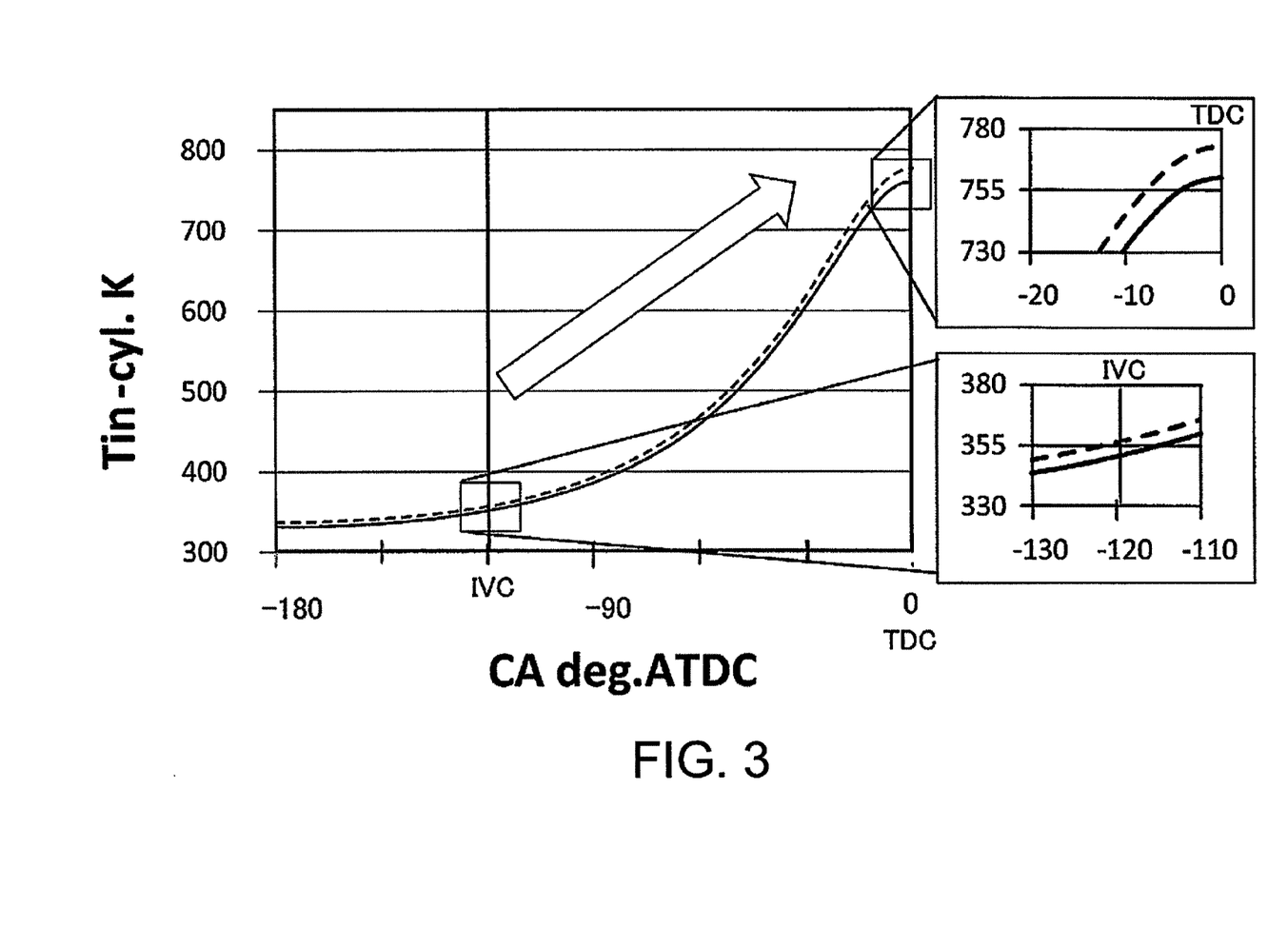
FIG. 3 is a graph illustrating changes in the gas temperature inside the cylinder in a compression stroke.

FIG. 3 is a graph illustrating changes in the gas temperature inside the cylinder in a compression stroke; an enlarged view is provided for the vicinity of the intake valve closing timing (IVC in the figure) and the compression top dead center (TDC in the figure). "Compression stroke" in the present embodiment refers to the interval from the time the intake valve closes to the time the exhaust valve opens.

When the compression stroke of the internal combustion engine 1 is regarded as an adiabatic compression stroke, the relationship of equation (1) is satisfied.

$$T \cdot V^{(k-1)} = \text{constant} \quad (1)$$

Here, T is the gas temperature inside the cylinder, V is the combustion chamber volume, and k is the specific heat ratio.

Using the gas temperature inside the cylinder Tivc at the intake valve closing timing, the gas temperature inside the cylinder Ttdc at the compression top dead center, the combustion chamber volume Vivc at the intake valve closing timing, and the combustion chamber volume Vtdc at the compression top dead center, the equation (2) is satisfied.

$$Ttdc \cdot Vtdc^{(k-1)} = Tivc \cdot Vivc^{(k-1)} \quad (2)$$

Equation (3) is obtained by modifying equation (2)

$$Ttdc = Tivc \times \varepsilon^{(k-1)} \quad (3)$$

Here, ε is the compression ratio.

By entering 1.3 as the specific heat ratio and 13 as the compression ratio, equation (3) becomes equation (4).

$$Ttdc \approx 2 \times Tivc \quad (4)$$

That is, when the compression ratio of the internal combustion engine 1 is 13, the gas temperature inside the cylinder at the compression top dead center becomes about twice the gas temperature inside the cylinder at the intake valve closing timing. Then, the temperature difference at the intake valve closing timing is amplified to twice at the compression top dead center. That is, if the gas temperature inside the cylinder is reduced at the intake valve closing timing, the decrease in the temperature at the compression top dead center is doubled.

Therefore, in the present embodiment, fuel injection control is carried out so that the reduction of the gas temperature inside the cylinder at the intake valve closing timing is greater.

Figure 4:
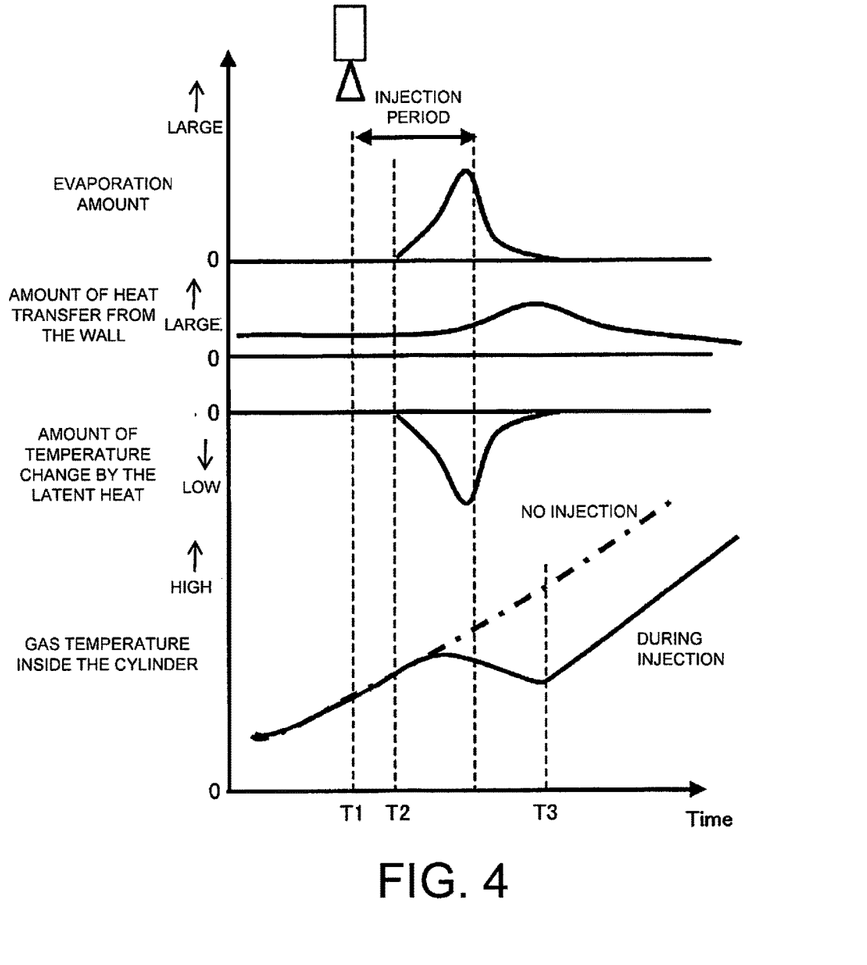
FIG. 4 is a timing chart illustrating the relationship between the evaporative latent heat and the gas temperature inside the cylinder.

FIG. 4 is an example of a timing chart when the gas temperature inside the cylinder is reduced by the evaporative latent heat of the fuel. The term "Wall" in the figure refers to the head-side wall surface and the block-side wall surface. In addition, the "evaporation amount," the "amount of heat transfer from the wall," and the "amount of temperature change by the latent heat" are amounts at each timing. Therefore, the area surrounded by each chart and the horizontal axis corresponds to the amount that affects the gas temperature inside the cylinder.

If the fuel injection is started at timing T1, the injected fuel begins to evaporate from timing T2 after a time lag. After the evaporation is started, the evaporation amount is gradually increased with the increase in the fuel amount in the cylinder and the progress of the diffusion of the fuel. Then, the evaporation amount decreases with a decrease in the amount of unevaporated fuel and the stopping of fuel injection.

The amount of temperature change by the latent heat will display the same behavior as the behavior of the evaporation amount described above. However, the direction of temperature change will be in a direction to reduce the gas temperature inside the cylinder. The gas temperature inside the cylinder will thereby start to decrease. However, a delay occurs between when the evaporation starts and when the gas temperature inside the cylinder starts to decrease.

Additionally, the amount of heat that is transferred from the wall will also affect the gas temperature inside the cylinder. The amount of heat transfer from the wall is increased as the difference between the gas temperature inside the cylinder and the wall temperature is increased. In other words, if the gas temperature inside the cylinder is reduced by the evaporative latent heat, the amount of heat transfer from the wall is increased after a time lag.

Therefore, the gas temperature inside the cylinder that is reduced by the evaporative latent heat is thereafter increased by the heat transfer from the wall.

Therefore, in the present embodiment, the controller 100 sets the start timing of the third fuel injection of FIG. 2 so that a timing T3 immediately before the gas temperature inside the cylinder turns to an increase coincides with the intake valve closing timing. In other words, the second fuel injection and the third fuel injection of the three-stage injection are set close to the intake valve closing timing, and, in particular, the third fuel injection timing is set as described above. If the gap between the second fuel injection and the third fuel injection is narrowed, the third fuel injection will be carried out in a state in which the gas temperature inside the cylinder is being reduced by the second fuel injection; therefore, the gas temperature inside the cylinder at the intake valve closing timing can be effectively reduced.

The fuel injection mode for reducing the gas temperature inside the cylinder at the intake valve closing timing is not limited to the above.

Figure 5:
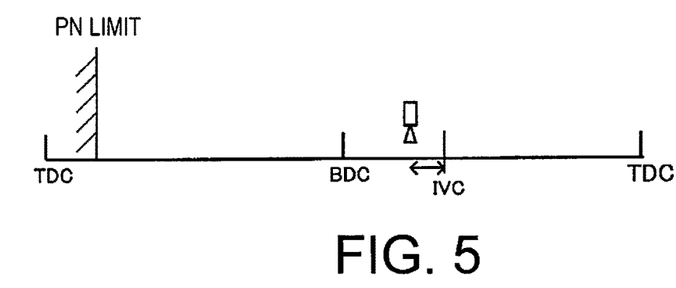
FIG. 5 is a schematic diagram illustrating another example of a fuel injection control pattern.

For example, in the case of a single-stage injection, such as illustrated in FIG. 5, the fuel injection timing of the single-stage injection is set to the timing described above. In the case of a single-stage injection, although the amount of heat transfer from the wall is increased due to an increase in the time period during which the fuel evaporates, the reduction margin of the gas temperature inside the cylinder due to the evaporative latent heat is increased, with the fuel injection amount per one injection becoming greater than in a multi-stage injection. When carrying out a multi-stage injection in the cold engine state and the warm-up state, it may be configured to switch to a single-stage injection when in the high water temperature state.

Figure 6:
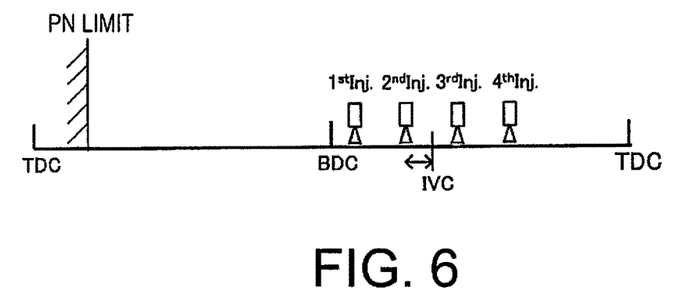
FIG. 6 is a schematic diagram illustrating yet another example of a fuel injection control pattern.

In addition, the weighted center of the multi-stage injection (hereinafter also simply referred to as "weighted center of injection") may be set to be at the intake valve closing timing, as illustrated in FIG. 6. Here, the weighted center of injection will be described with reference to FIG. 7.

Figure 7:
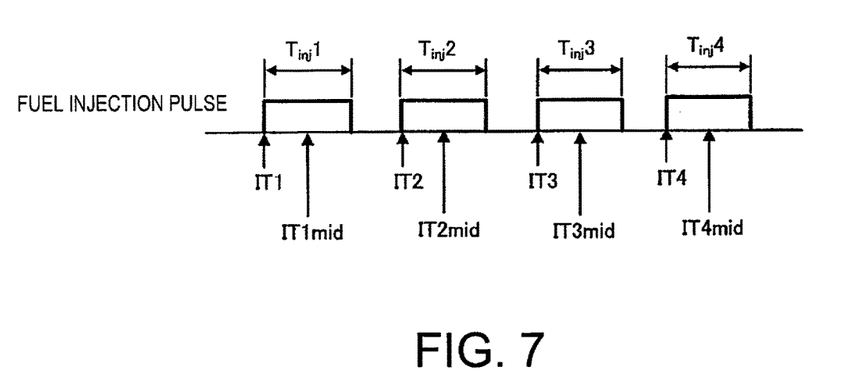
FIG. 7 is a schematic diagram illustrating a fuel injection pulse of a four-stage injection.

FIG. 7 is a schematic diagram illustrating a fuel injection pulse of a four-stage injection. IT1-IT4 is the start timing of each fuel injection, and $T_{inj}1$-$T_{inj}4$ is the fuel injection period (injection pulse width) of each fuel injection. In addition, IT1mid-IT4mid is the midpoint of each fuel injection period. At this time, the weighted center of the injection ITc can be expressed by the equation (5).

$$IT_C = \frac{T_{inj}1 \times IT1_{mid} + T_{inj}2 \times IT2_{mid} + T_{inj}3 \times IT3_{mid} + T_{inj}4 \times IT4_{mid}}{T_{inj}\text{total}} \quad (5)$$

$T_{inj}$ total is the total value of the injection pulse widths.

In cases where the number of times of injection is different, such as a two-stage injection and a three-stage injection, the same calculation is carried out using the fuel injection timing ITn, injection pulse width $T_{inj}$n, and the midpoint of the fuel injection period $ITn_{mid}$.

When setting the fuel injection timing so that the weighted center of injection ITc matches the intake valve closing timing, the effect of reducing the gas temperature inside the cylinder at the intake valve closing timing is reduced compared to FIG. 2 and FIG. 5, corresponding to the decrease in the fuel injection amount before the intake valve closing timing. However, the gas temperature inside the cylinder is reduced due to the evaporative latent heat of the fuel that is injected in the compression stroke.

Next, the control routine of the fuel injection control in the high water temperature state described above will be described.

Figure 8:
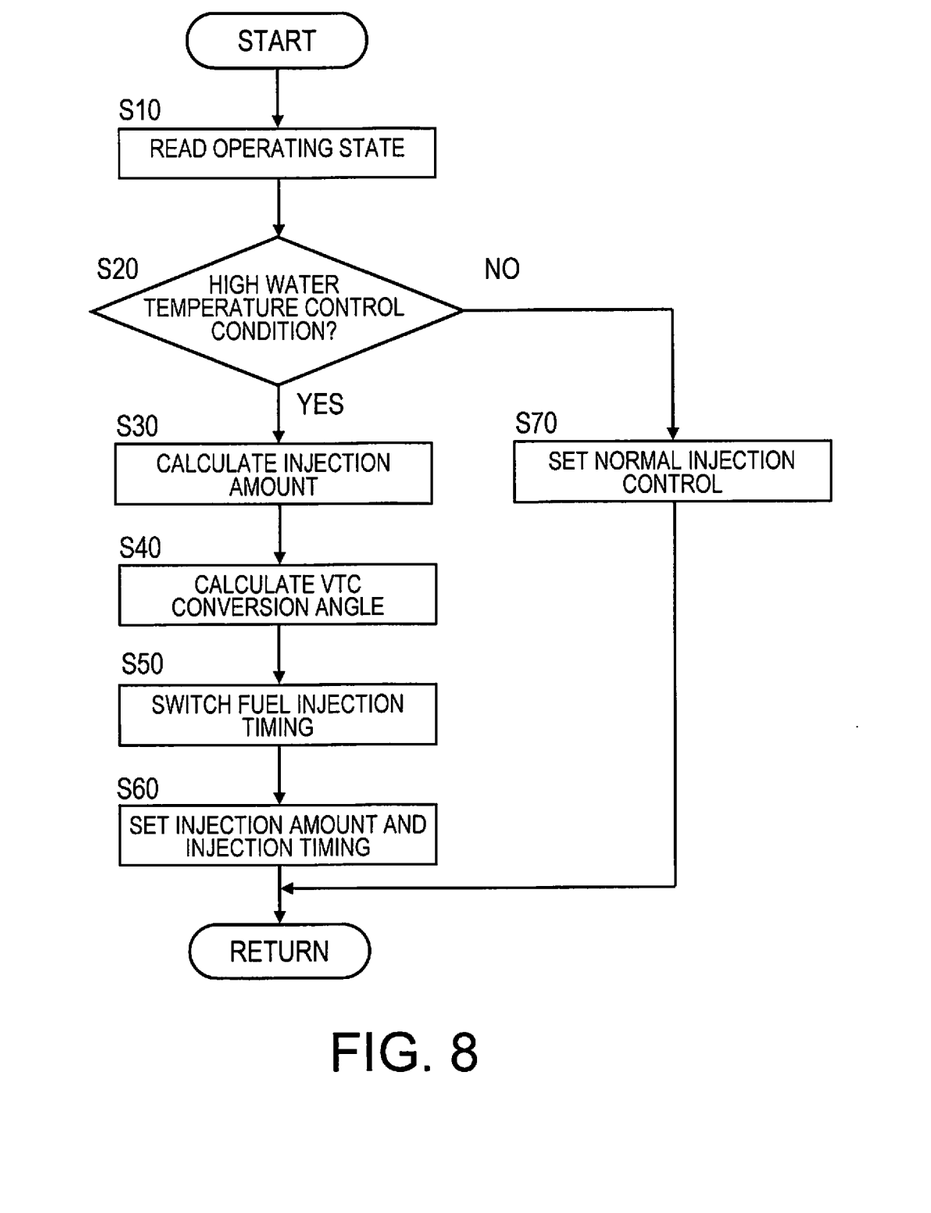
FIG. 8 is a flowchart illustrating a control routine of a fuel injection control.

FIG. 8 is a flowchart illustrating the control routine of a fuel injection control that is executed by the controller 100.

In Step S10, the controller 100 reads the driving state. Specifically, the detection signal of the crank angle sensor 18 is read as the engine rotational speed, and the detection signal of the accelerator pedal opening amount sensor 17 is read as the load.

In Step S20, the controller 100 determines whether or not the state is a high water temperature state. The determination is carried out based on the above-described threshold value. If in a high water temperature state, the process of Step S30 is executed, and if not in the high water temperature state, the process of Step S70 is executed. In Step S70, the controller 100 executes a normal fuel injection control; that is, a fuel injection control for a cold engine state when in a cold engine state, and for a warm-up state when in a warm-up state.

In Step S30, the controller 100 calculates the fuel injection amount. A well-known calculation method is used for calculating the fuel injection amount. That is, a fuel injection amount map having the engine rotational speed and the load as parameters is created in advance, and the map is searched for the engine rotational speed and the load that are read in Step S10.

In Step S40, the controller 100 calculates the conversion angle of a variable valve mechanism VTC. The variable valve mechanism VTC is a mechanism that variably controls the opening and closing timing of the intake valves. The variable valve mechanism VTC used in the present embodiment is well-known; therefore, a description of the configuration of the variable valve mechanism VTC is omitted.

A conversion angle map is created in advance having, as parameters, the engine rotational speed and the load as the driving states, and the controller 100 searches the map using the driving state that has been read. If a variable valve mechanism VTC is not provided, the present step is omitted.

Figure 9:
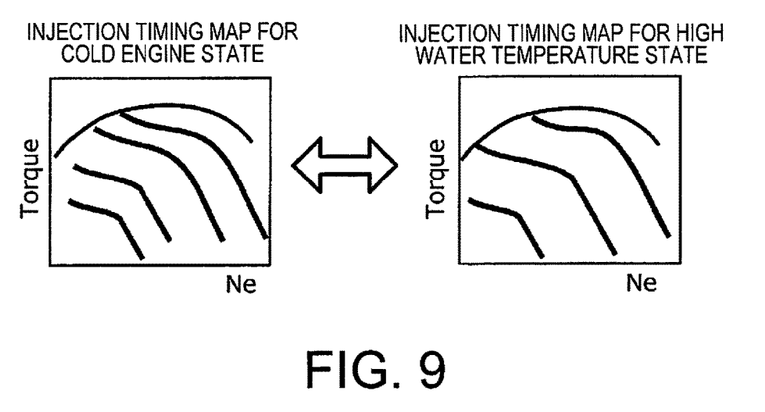
FIG. 9 shows two graphs explaining the switching of a fuel injection timing map.

In Step S50, the controller 100 switches the fuel injection timing to a timing corresponding to the high water temperature state described above. For example, when transitioning from the cold engine state to the high water temperature state, the map is switched from the injection timing map for the cold engine state to the injection timing map for the high water temperature state, as illustrated in FIG. 9. In each injection timing map, the injection timing that is suitable for each driving state is assigned, using as parameters the engine rotational speed and the load as the driving states. When carrying out a multi-stage injection, an injection timing map is prepared for each injection. Then, the fuel injection start timing is calculated from the fuel injection timing map for the high water temperature state.

Figure 10:
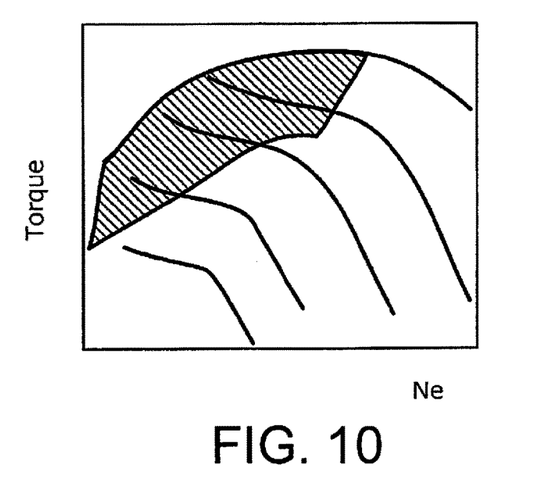
FIG. 10 is a graph illustrating one example of a fuel injection timing map.

The ignition timing for the high water temperature state may be calculated by arithmetic only in the operation region in which knocking is likely to occur, instead of switching the ignition timing map. For example, let the shaded region in the ignition timing map for the cold engine state of FIG. 10 be the operation region in which knocking is likely to occur. In this case, the fuel injection timing ITn for reducing the gas temperature inside the cylinder at the intake valve closing timing can be calculated by equation (6).

$$ITn = IVC - Tevap \quad (6)$$

Here, IVC is the intake valve closing timing, and Tevap is the time that is required from when the temperature starts to decrease due to the evaporative latent heat, until the temperature decrease amount becomes the maximum.

When carrying out a multi-stage injection, other injection timings can be calculated based on the fuel injection timing described above.

As described above, it is possible to reduce the calculation load, by calculating the ignition timing for knock prevention only in an operation region in which knocking is likely to occur and using the ignition timing map for the cold engine state in the other operation regions.

In the same way, when matching the weighted center of injection with the intake valve closing timing, the ignition timing for the high water temperature state may be calculated only in an operation region in which knocking is likely to occur. In this case, the weighted center of injection ITc is determined by equation (7). Then, the start timing of each fuel injection can be calculated based on the weighted center of injection ITc.

$$ITc = IVC - Tevap \quad (7)$$

In Step S60, the controller 100 sets the fuel injection amount obtained in Step S30 and the fuel injection start timing obtained in Step S50 as the present fuel injection amount and fuel injection start timing.

The action and effects of the above-described present embodiment will be described.

(1) The controller 100, as the fuel injection control device of the present embodiment, controls the fuel injection of a spark-ignition internal combustion engine 1 for direct injection into a cylinder, and independently controls the circulation of coolant in a head-side cooling channel 21 and the circulation of a coolant in a block-side cooling channel 22. The controller 100 sets a fuel injection timing for cooling the inside of the cylinder such that an intake air valve closing timing occurs during a reduction in gas temperature inside the cylinder due to evaporative latent heat of the injected fuel while in the high water temperature state, and injects fuel based on the fuel injection timing for cooling the inside of the cylinder. It is thereby possible to reduce the gas temperature inside the cylinder near the compression top dead center where knocking is likely to occur, in order to prevent knocking. That is, it is possible to prevent knocking while promoting a rise in the oil temperature.

(2) In the present embodiment, since the controller 100 sets the fuel injection timing for cooling the inside of the cylinder such that an intake valve closing timing occurs when the amount of reduction in gas temperature inside the cylinder due to the evaporative latent heat of the injected fuel is the maximum; therefore, it is possible to further reduce the gas temperature inside the cylinder near the compression top dead center.

(3) When carrying out a multi-stage injection, the controller 100 sets one injection of the multi-stage injection to the fuel injection timing for cooling the inside of the cylinder. It is thereby possible to reduce the gas temperature inside the cylinder near the compression top dead center by utilizing the evaporative latent heat of the fuel that is injected in one of the injections.

(4) When carrying out a multi-stage injection, the controller 100 sets the final fuel injection of a plurality of fuel injections to the fuel injection timing for cooling the inside of the cylinder. It is thereby possible to take a longer fuel mixing time compared to injecting fuel during the compression stroke; therefore, it is possible not only to prevent knocking, but also to prevent a degradation of the exhaust emissions.

(5) When carrying out a multi-stage injection in the cold engine state and the warm-up state, the controller 100 may switch to a single-stage injection in a high water temperature state, and set the fuel injection timing for the single-stage injection as the fuel injection timing for cooling the inside of the cylinder. In this case as well, it is possible to reduce the gas temperature inside the cylinder near the compression top dead center by the evaporative latent heat of the fuel, in order to prevent knocking.

(6) When carrying out a multi-stage injection, the fuel injection timing for cooling the inside of the cylinder may be set to each of the fuel injection timings of the multi-stage injection so that the weighted center of injection matches the intake valve closing timing. In this case as well, it is possible to reduce the gas temperature inside the cylinder near the compression top dead center by the evaporative latent heat of the fuel, in order to prevent knocking.

(7) The time lag from when the fuel is injected until the fuel evaporates becomes shorter as the head-side wall temperature and the block-side wall temperature increase. Accordingly, even if the fuel injection timing for cooling the inside of the cylinder is set further on the advance side than the intake valve closing timing by a time corresponding to the fuel injection period (for example about 0.5 milliseconds to 5 milliseconds), an effect of reducing the gas temperature inside the cylinder at the intake valve closing timing can be sufficiently obtained.

The circulation of the cooling water of the block-side cooling channel 22 may be configured to stop if the water temperature of the block-side cooling channel 22 becomes lower than, for example, 95° C., even after entering the warm-up state. This is to suppress a decrease in the fuel efficiency by increasing the temperature of the cylinder block 3 to reduce the friction between the piston and the cylinder wall. In this case, knocking is likely to occur due to the increase in temperature of the cylinder block 3; therefore, knocking is prevented by executing the fuel injection control in the high water temperature state described above.

Embodiments of the present invention were described above, but the above-described embodiments illustrate only a portion of the application examples of the present invention, and it is not intended to limit the technical scope of the present invention to the specific configurations of the above-described embodiments.

The invention claimed is:

1. A fuel injection control device for controlling a fuel injection of a spark-ignition direct-injection internal combustion engine that has a cooling system including a head-side cooling channel for cooling a cylinder head and a block-side cooling channel for cooling a cylinder block, the cooling system being configured to enable a circulation of a coolant in the head-side cooling channel and a circulation of the coolant in the block-side cooling channel to be controlled independently, the fuel injection control device comprising:
   a controller programmed to set a fuel injection timing for cooling the inside of the cylinder to occur between an intake bottom dead center timing and an intake valve closing timing such that the intake valve closing timing occurs during a reduction in gas temperature inside the cylinder due to evaporative latent heat of the injected fuel while the cooling system is in a state in which the coolant circulates in the head-side cooling channel and the circulation of the coolant in the block-side cooling channel is stopped,
   the controller being further programmed to inject the fuel based on the fuel injection timing set for cooling the inside of the cylinder.

2. The fuel injection control device according to claim 1, wherein
   the controller is further programmed to set the fuel injection timing for cooling the inside of the cylinder such that the intake valve closing timing occurs when the amount of reduction in the gas temperature inside the cylinder is a maximum, due to the evaporative latent heat of the injected fuel.

3. The fuel injection control device according to claim 1, wherein
   the controller is further programmed to set one of a plurality of fuel injections as the fuel injection timing for cooling the inside of the cylinder in a case of a multi-stage injection that carries out fuel injection a plurality of times per one cycle.

4. The fuel injection control device according to claim 3, wherein
the controller is further programmed to set a final fuel injection of the plurality of fuel injections as the fuel injection timing for cooling the inside of the cylinder.

5. The fuel injection control device according to claim 1, wherein
the controller is further programmed to switch from a multi-stage injection to a single-stage injection that carries out one fuel injection per one cycle; and
the controller is further programmed to set the one fuel injection as the fuel injection timing for cooling the inside of the cylinder.

6. The fuel injection control device according to claim 1, wherein
the controller is further programmed to set the fuel injection timing for cooling the inside of the cylinder to each of the fuel injection timings of the multi-stage injection set so that a weighted center of injection of the multi-stage injection matches the intake valve closing timing in a case of a multi-stage injection that carries out fuel injection a plurality of times per one cycle.

7. The fuel injection control device according to claim 1, further comprising
at least one of a head-side wall temperature sensor that detects a cooling water temperature of the head-side cooling channel, and a head-side wall temperature sensor that detects a wall temperature of the cylinder head; and
the controller being further programmed to set the fuel injection timing for cooling the inside of the cylinder upon determining the cooling water temperature of the head-side cooling channel or the wall temperature of the cylinder head is greater than, or equal to, a predetermined value.

8. The fuel injection control device according to claim 1, further comprising
an oil temperature sensor that detects the lubricating oil temperature of the internal combustion engine; and
the controller being further programmed to set-the fuel injection timing for cooling the inside of the cylinder upon determining the lubricating oil temperature is greater than, or equal to, a predetermined value.

9. The fuel injection control device according to claim 1, wherein
the controller is further programmed to set the fuel injection timing for cooling the inside of the cylinder in advance of the intake valve closing timing by a time corresponding to a fuel injection period.

10. The fuel injection control device according to claim 2, wherein
the controller is further programmed to set one of a plurality of fuel injections as the fuel injection timing for cooling the inside of the cylinder in a case of a multi-stage injection that carries out fuel injection a plurality of times per one cycle.

11. The fuel injection control device according to claim 10, wherein
the controller is further programmed to set a final fuel injection of the plurality of fuel injections as the fuel injection timing for cooling the inside of the cylinder.

12. The fuel injection control device according to claim 2, wherein
the controller is further programmed to switch from a multi-stage injection to a single-stage injection that carries out one fuel injection per one cycle; and
the controller is further programmed to set the one fuel injection as the fuel injection timing for cooling the inside of the cylinder.

13. The fuel injection control device according to claim 2, further comprising
at least one of a head-side wall temperature sensor that detects a cooling water temperature of the head-side cooling channel, and a head-side wall temperature sensor that detects a wall temperature of the cylinder head; and
the controller being further programmed to set-the fuel injection timing for cooling the inside of the cylinder upon determining the cooling water temperature of the head-side cooling channel or the wall temperature of the cylinder head is greater than, or equal to, a predetermined value.

14. The fuel injection control device according to claim 3, further comprising
at least one of a head-side wall temperature sensor that detects a cooling water temperature of the head-side cooling channel, and a head-side wall temperature sensor that detects a wall temperature of the cylinder head; and
the controller being further programmed to set-the fuel injection timing for cooling the inside of the cylinder upon determining the cooling water temperature of the head-side cooling channel or the wall temperature of the cylinder head is greater than, or equal to, a predetermined value.

15. The fuel injection control device according to claim 4, further comprising
at least one of a head-side wall temperature sensor that detects a cooling water temperature of the head-side cooling channel, and a head-side wall temperature sensor that detects a wall temperature of the cylinder head; and
the controller being further programmed to set-the fuel injection timing for cooling the inside of the cylinder upon determining the cooling water temperature of the head-side cooling channel or the wall temperature of the cylinder head is greater than, or equal to, a predetermined value.

16. The fuel injection control device according to claim 2, further comprising
an oil temperature sensor that detects the lubricating oil temperature of the internal combustion engine; and
the controller being further programmed to set the fuel injection timing for cooling the inside of the cylinder upon determining the lubricating oil temperature is greater than, or equal to, a predetermined value.

17. The fuel injection control device according to claim 3, further comprising
an oil temperature sensor that detects the lubricating oil temperature of the internal combustion engine; and
the controller being further programmed to set the fuel injection timing for cooling the inside of the cylinder upon determining the lubricating oil temperature is greater than, or equal to, a predetermined value.

18. The fuel injection control device according to claim 4, further comprising
an oil temperature sensor that detects the lubricating oil temperature of the internal combustion engine; and the controller being further programmed to set the fuel injection timing for cooling the inside of the cylinder upon determining the lubricating oil temperature is greater than, or equal to, a predetermined value.

19. The fuel injection control device according to claim 5, further comprising an oil temperature sensor that detects the lubricating oil temperature of the internal combustion engine; and the controller being further programmed to set the fuel injection timing for cooling the inside of the cylinder upon determining the lubricating oil temperature is greater than, or equal to, a predetermined value.

20. A fuel injection control method for controlling a fuel injection of a spark-ignition direct-injection internal combustion engine that has a cooling system including a head-side cooling channel for cooling a cylinder head and a block-side cooling channel for cooling a cylinder block, the cooling system being configured to enable a circulation of a coolant in the head-side cooling channel and a circulation of the coolant in the block-side cooling channel to be controlled independently, the fuel injection control method comprising:

setting a fuel injection timing for cooling the inside of the cylinder to occur between an intake bottom dead center timing and an intake valve closing timing such that the intake valve closing timing occurs during a reduction in the gas temperature inside the cylinder due to evaporative latent heat of the injected fuel while the cooling system is in a state in which the coolant circulates the coolant circulates in the head-side cooling channel and the circulation of the coolant in the block-side cooling channel is stopped; and, injecting fuel based on the fuel injection timing for cooling the inside of the cylinder.

* * * * *